US008812693B2

(12) United States Patent
Haynes (10) Patent No.: US 8,812,693 B2
(45) Date of Patent: Aug. 19, 2014

(54) SYSTEM AND METHOD OF IMPLEMENTING AGGREGATED VIRTUAL PRIVATE NETWORK (VPN) SETTINGS THROUGH A SIMPLIFIED GRAPHICAL USER INTERFACE (GUI)

(76) Inventor: William Biddle Haynes, Simpsonville, SC (US)

( * ) Notice: Subject to any disclaimer, the term of this patent is extended or adjusted under 35 U.S.C. 154(b) by 412 days.

(21) Appl. No.: 13/292,509

(22) Filed: Nov. 9, 2011

(65) Prior Publication Data

US 2013/0117459 A1    May 9, 2013

(51) Int. Cl.
*G06F 15/16* (2006.01)
*G06F 3/00* (2006.01)
*H04L 29/00* (2006.01)

(52) U.S. Cl.
CPC . *G06F 3/00* (2013.01); *H04L 29/00* (2013.01)
USPC ............................. 709/228; 709/221; 709/227

(58) Field of Classification Search
CPC ..... H04L 41/22; H04L 41/0813; H04L 67/34; H04L 41/08; H04L 41/0803; H04L 65/1069
USPC ................................................. 709/221, 228
See application file for complete search history.

(56) References Cited

U.S. PATENT DOCUMENTS

| 6,871,221 | B1 * | 3/2005 | Styles ........................... 709/221 |
| 7,953,889 | B2 * | 5/2011 | Suganthi et al. .............. 709/239 |
| 2006/0080441 | A1 * | 4/2006 | Chen et al. ..................... 709/225 |
| 2012/0036244 | A1 * | 2/2012 | Ramachandra et al. ...... 709/223 |

OTHER PUBLICATIONS

NPL "RV042-User Guide" 2008.*
NPL "WRVS4400N-User Guide" 2008.*
NPL "WRV200-User Guide" 2007.*

* cited by examiner

*Primary Examiner* — Phuoc Nguyen
(74) *Attorney, Agent, or Firm* — Dority & Manning, PA (57) ABSTRACT

Systems and methods are provided for defining an operating system that automates setup and implements a virtual private network (VPN) on a network interface device such as a router. A graphical user interface module comprises instructions for electronically providing a graphical user interface including a plurality of interface elements to a user who then may provide customizable input defining a first set of variable parameters. An automation layer module comprises instructions defining the type of graphical user interface to display to a user and instructions for electronically accessing a particular data file defining a second set of static parameters. A firmware module and related processor programs and the network interface device and executes the programmed code to establish a VPN connection in accordance with a configuration defined by the first set of variable parameters and the second set of static parameters.

20 Claims, 3 Drawing Sheets

SYSTEM AND METHOD OF IMPLEMENTING AGGREGATED VIRTUAL PRIVATE NETWORK (VPN) SETTINGS THROUGH A SIMPLIFIED GRAPHICAL USER INTERFACE (GUI)

FIELD OF THE INVENTION

The present subject matter generally relates to network interface devices such as routers and the like. More particularly, the present technology relates to systems and methods of implementing aggregated Virtual Private Network (VPN) settings through a simplified Graphical user Interface (GUI) for routers and other network interface devices.

BACKGROUND OF THE INVENTION

Routers conventionally serve a particular type of function in interfacing the nodes in a data communication network. In particular, routers or similar network interface devices are generally employed to forward data packets between different communication nodes in a computer network. This function of directing network traffic is generally accomplished by a router by reading address information in relayed data packets to help determine their ultimate destination. Using information in a routing table and/or specific routing protocol, a router can effectively direct data packets to subsequent routers, other communication nodes and/or ultimate destination node locations.

One particular application for routers involves their use in implementing a virtual private network (VPN) connection between network nodes. A VPN provides a secure avenue for transporting data packets over the Internet or other unsecure public network using encryption and/or authentication techniques. VPN connections are often used to implement remote desktop applications for workers away from a home office so that network resources are more readily available and so that data relayed to the home office is secure.

Additional advantages are provided by using VPN routers, in part because they provide visible internet protocol (IP) addresses based on a home server ID as opposed to individual machine IP addresses or personal IDs. This type of addressing arrangement can facilitate a variety of VPN applications, including anonymous web browsing, firewall protection from malicious network attacks, additional protection from personal data theft, etc.

Still further, users located in foreign countries that may have different Internet controls and accessibility restrictions can use VPNs to tunnel their network connection to a different geographic region. For example, a user located in China or Saudi Arabia can use a VPN to tunnel their network connection back to the United States in order to make authorized e-commerce transactions, access NETFLIX, VONAGE, or other U.S. based commodities, or simply to surf the web or view news stories without restrictions as if the user was actually physically located in the United States.

In order to implement the particular types of configurations needed to implement the above types of VPN connections and other router applications, a router must be programmed to operate in a particular manner. Many commercial routers are outfitted with manufacturer's firmware that can be extremely limited as far as the ability to program the router to perform in customized manners. As such, a need remains for customized firmware that can replace the firmware that comes pre-installed on many commercial routers.

SUMMARY OF THE INVENTION

In view of the recognized features encountered in the prior art and addressed by the present subject matter, improved systems and methods for implementing a customized operating system and streamlined user interface for setting up communication links for routers and other network interface devices are provided. In general, such communication links are set up by a streamlined process of installing aggregated Virtual Private Network (VPN) settings.

In one exemplary embodiment, a method of implementing setup configurations for a network interface device comprises a step of identifying a plurality of electronic parameters that need to be programmed into memory associated with a network interface device to properly establish a communication link with at least one other node in a communication network. The plurality of electronic parameters are categorized into a first set of variable parameters and a second set of static parameters. A graphical user interface (GUI) including a plurality of interface elements configured to receive data defining the first set of variable parameters is electronically provided to a user. User data is received via the GUI for defining the first set of variable parameters, which helps determine in part which static parameters to electronically access via one or more data files. Memory associated with the network interface device is then programmed to establish a communication link in accordance with a configuration defined by the first set of variable parameters provided via the graphical user interface and the second set of static parameters electronically accessed by the data file.

In some more particular exemplary embodiments, the network interface device comprises a router, or more particularly a VPN router, while the at least one node in the communication network comprises a different VPN router or a VPN server provided in a different geographic location. In one embodiment, the first set of variable parameters may include a number of specific parameters including but not limited to one or more of a first variable parameter corresponding to a network connection type (e.g., PPTP, OpenVPN, L2TP and other suitable connection types), a second variable parameter corresponding to an identifier for the at least one other node in a communication network (e.g., VPN server location). In another embodiment, the first set of variable parameters comprises a file pointer for loading a file with all data identified by the second set of static parameters as well as any additional parameters other than the file pointer in the first set of variable parameters. This identified file data is then programmed into the memory associated with the network interface device.

In addition to various methodologies, the present subject matter equally relates to associated systems, including various hardware, software and/or firmware components that may be provided in or accessible by a network interface device such as a router. In one exemplary embodiment, a network interface device comprises at least one memory device and a processor. The at least one memory device may be configured for storing computer readable instructions defining an operating system for implementing a virtual private network (VPN) on the network interface device. The computer readable instructions can comprise a plurality of executable modules, including a graphical user interface module, an automation layer module and a firmware module. The graphical user interface module comprises instructions for electronically providing a graphical user interface to a user, wherein the graphical user interface provides interface elements by which a user may provide customizable input for a defining a first set of variable parameters. The automation layer module comprises instructions defining the type of graphical user interface to display to a user and instructions for electronically accessing a particular data file defining a second set of static parameters. The firmware module comprises instructions for programming the network interface device to establish a VPN connection in accordance with a configuration defined by the first set of variable parameters provided via the graphical user interface and the second set of static parameters electronically accessed by the automation layer module. The processor is configured to execute the computer readable instructions stored in the firmware module and to establish a VPN connection with at least one other VPN node provided in a different geographic location than the network interface device.

Additional exemplary embodiments of the disclosed technology concern computer-readable media storing computer-executable instructions that, when executed by one or more processors, cause the one or more processors to perform various actions as identified in the above-referenced method steps and others. Still further embodiments of the disclosed technology concern graphical user interfaces that are provided with interface elements for receiving data defining a first set of variable parameters that are needed to at least partially define a type of network connection (e.g., a VPN connection) between a VPN router and another device in a communication network.

Additional aspects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with the provision of improved methodology and corresponding systems for implementing a customized operating system and streamlined user interface for implementing setup configurations for routers and other network interface devices.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 1:
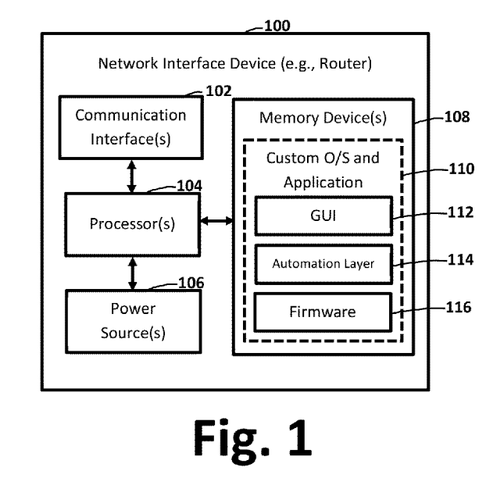
FIG. 1 is a block diagram of exemplary system components within a network interface device such as a router in accordance with embodiments of the disclosed technology.

Referring now to FIG. 1, exemplary components of a network interface device 100 include one or more communication interfaces 102, one or more processors 104, one or more power sources 106 and one or more memory devices 108. Network interface device is described in one exemplary embodiment herein as corresponding to a router, although additional electronic communication devices for interfacing with a communication network may be employed. In some particular non-limiting embodiments, network interface device 100 may include a wireless router and/or a virtual private network (VPN) router for establishing VPN connections with other nodes in a communications network. This exemplary embodiment will be better appreciated with respect to FIG. 2, which illustrates an implementation of a network-based VPN connection between a VPN server and VPN client (e.g., router) in different geographic locations.

Referring still to FIG. 1, the one or more communication interfaces 102 provided as part of network interface device 100 can be configured to provide physical connection between the network interface device 100 and a network or other networked device (e.g., a cable modem, wireless component, computer or the like). Communication interfaces 102 may be available for different physical types of network connections, such as but not limited to copper cable connections, fiber optic connections, wireless transmission arrangements and the like. One or more power sources 106 may be provided in order to provide operating power for the network interface device 100. Power sources may include internal and/or external batteries, AC/DC power converter modules for harvesting power from an external source, or other suitable power elements.

Referring still to FIG. 1, additional functional aspects of network communication device 100 are collectively embodied by the combination of the one or more processors 104 and the one or more memory devices 108. The memory device 108 may correspond to a computer-readable medium defining software instructions and/or related data defining a custom operating system (O/S) and device setup application 110 for network interface device 100. When the instructions stored in memory device 108 are read and executed by processor 104, the network interface device 100 becomes outfitted to operate as a special purpose machine in accordance with various functional objectives of the presently disclosed technology.

Memory device 108 may be provided as a single or multiple portions of one or more varieties of computer-readable media, such as but not limited to any combination of temporary or volatile memory (e.g., random access memory (RAM, such as DRAM, SRAM, etc.) and permanent or nonvolatile memory (e.g., ROM, flash, hard drives, magnetic tapes, CD-ROM, DVD-ROM, etc.) or any other memory devices including diskettes, drives, other magnetic-based storage media, optical storage media, solid state storage media and others.

The custom operating system and device setup application 110 ultimately may include a plurality of different software modules for accomplishing various steps and objectives as disclosed herein. For example, custom operating system and device setup application 110 may include a graphical user interface (GUI) module 112, an automation layer module 114 and a firmware module 116. Exemplary modules 112-116, respectively, may be broken down into multiple software sub-modules or additional particular modules than those shown in FIG. 1 may also be provided. In addition, although only one memory device 108 is illustrated in FIG. 1 as storing these various modules, this is only an exemplary illustration. It should be appreciated that such data may be stored in a variety of fashions, including together in a single memory device or distributed across multiple memory devices in one or more local and/or remote locations.

The general purpose of the custom operating system and device setup application 110 is to provide for installation of an aggregated set of commands and security components required for effectively establishing a communications link between the network interface device 100 and another node in a communications network. The aggregated set of commands and security components that will ultimately need programmed into memory associated with network interface device 100 in order to effectively implement such communications link is at least partly defined by a plurality of electronic parameters. The plurality of electronic parameters can be categorized or preconfigured into at least two sets of parameters, a first set of variable parameters and a second set of static parameters. The first set of variable parameters corresponds to those parameters that may change based on user selection or customization based on specific options available to the VPN client. The second set of static parameters corresponds to those parameters that are needed to program network interface device 100 but that will be the same regardless of the variable parameters or that can be defined based on their direct dependencies on the data defining the variable parameters.

Referring still to the custom O/S and device setup application 110, the GUI module 112 generally is configured to electronically provide a graphical user interface (GUI) to a user. The GUI preferably includes a plurality of interface elements (e.g., text input elements, selectable buttons, drop down menus and the like) by which a user may provide customizable input for such plurality of interface elements. The input received via the GUI defines selected ones of the plurality of variable parameters needed for implementing a communication link for network interface device 100. The GUI may be defined by software or may be a web-based GUI accessible via a network. For web-based implementations, the GUI may be defined to be in compliance with applicable standards, for example those defined by the World Wide Web Consortium (WC3). Additionally, GUIs in accordance with the disclosed technology may supply interface elements that correspond with advanced options that allow user customization and technical alteration of key VPN controls. Informative elements may also be provided within the GUI, such as a VPN status corner for providing a clear user experience.

The GUI information available via GUI module 112 may be provided visually to a user via one or more output devices available as a peripheral device or an integral part of a coupled computer or other electronic device. Exemplary output devices may include but are not limited to monitors, printers or other devices for visually depicting output data created in accordance with the disclosed technology. Data may be input by a user relative to the GUI by one or more input devices available as a peripheral device or an integral part of a coupled computer or other electronic device. Exemplary input devices may include but are not limited to a keyboard, joystick, touchscreen monitor, eye tracker, microphone, mouse and the like.

Referring still to the custom O/S and device setup application 110, the automation layer module 114 generally is configured to automate the user interfaces displayed via GUI module 112 as well as to handle ultimate programming and initialization of the network interface device. For example, different GUIs may be displayed to a user depending on what type of network protocol (e.g., PPTP, OpenVPN, L2TP, etc.) the user's network interface device is configured to use, what type of company that is hosting the VPN server(s) to which a user's network interface device will ultimately link to, or other additional factors. For example, the user of one VPN service may be required to supply a type of security control that may be provided in one custom interface, whereas a different custom interface may be provided to the user of a service whose encryption is uniform and need not specify that type of security control. It should be appreciated that although the specific examples of PPTP, L2TP, and OpenVPN connection types are disclosed herein, the present technology is not limited to these examples and may be applied to any particular type of network protocol existing now or developed in the future.

In addition, automation layer module 114 may be further configured to access a particular data file defining the second set of electronic parameters. For example, once a user enters customizable data defining the first set of variable parameters into the GUI, the application layer module 114 may analyze those inputs and map them to the appropriate additional static parameters that need to be identified and ultimately programmed into the memory associated with network interface device 100 in order to effectively establish a communication link defined by such electronic parameters. As such, the automation layer code allows the O/S to adapt to different VPN services with the change of a single variable parameter or selected set of variable parameters.

Referring still to the custom O/S and device setup application 110, the firmware module 116 generally comprises the instructions that are ultimately programmed into memory associated with the network interface device. This memory associated with the network interface device can either be provided locally within network interface device, locally within a connected peripheral device or remotely in a network-accessible storage location. The programmed instructions provided within firmware module 116 are intended to establish the communications link (e.g., VPN connection) defined by the first set of variable parameters provided via GUI module 112 and second set of static parameters electronically accessed by the automation layer module 114. In some specific applications, the firmware module 116 is designed to allow different types of communications links depending on different networking protocol standards (e.g., PPTP, OpenVPN and/or L2TP protocols.) The firmware ultimately enables data packets to be forwarded from one protocol transmission system to another.

In some particular embodiments, the firmware module 116 is configured to allow PPTP connections to run over Point-to-Point Protocol over Ethernet (PPPoE) using multiple, non-conflicting PPP daemons. In other particular embodiments, firmware module 116 is configured to generate and install various security measures, such as but not limited to IP tables and firewall rules for security, port-forwarding of appropriate services, and prevention of common exploits of tunneling protocols. Status reports may also be provided via firmware module 116 or other software modules within application 110.

The custom O/S and device setup application 110 stored in memory device 108 generally corresponds to software instructions rendered in a non-transitory computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the methods and systems set forth and disclosed herein may also be implemented by hard-wired logic or other circuitry, including, but not limited to application-specific circuits. Of course, various combinations of computer-executed software and hard-wired logic or other circuitry may be suitable, as well.

In one non-limiting example, different specific programming languages and applications can be used to implement the custom O/S and device setup application 110. In such exemplary embodiment, the GUI module 112 is defined using Cascading Style Sheets (CSS) or other suitable style language for defining the layout of the GUI, which may be in the form of a HyperText Markup Language (HTML) document, Extensible Markup Language (XML) document or other suitable document type. In some embodiments, the combination of HTML and CSS technologies is embodied as a web-development technology referred to as AJAX (Asynchronous JavaScript and XML), which may also use additional programming features for accessing and manipulating the Document Object Model (DOM) representation of the various objects in the documents.

The automation layer 114 may be defined in a particular example using Javascript, bourne shell scripting, active server pages and a common gateway interface. Firmware 116 may be defined using C code at the hardware level with some assembly level language required. The interaction between automation layer 114 and firmware 116 may utilize HyperText Transfer Protocol (HTTP) requests as a primary medium.

Figure 2:
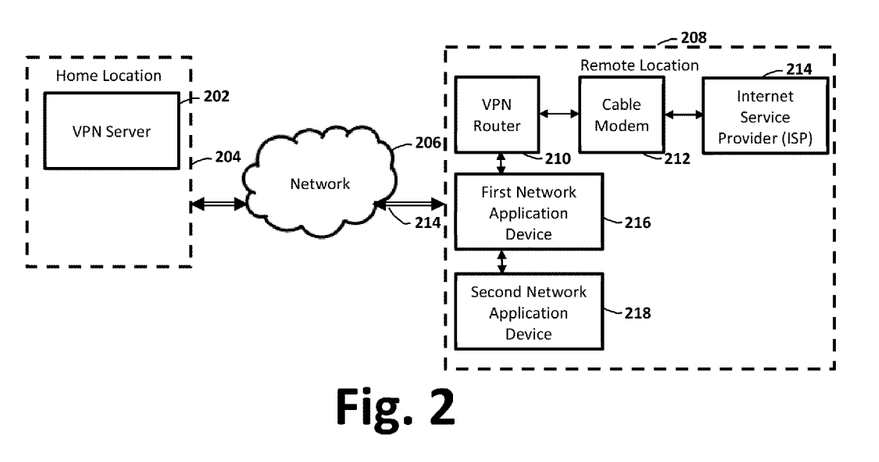
FIG. 2 is a schematic illustration of exemplary component interaction in a communications link established among a network interface device and related components and at least one other node in the communication network.

Referring now to FIG. 2, an exemplary system application is illustrated for network interface device 100 of FIG. 1. In the particular example of FIG. 2, network interface device 100 is embodied as a VPN router or VPN client device 210. The VPN router 210 provided at a remote location 208 is ultimately coupled via communications link 214 (e.g., a tunneled VPN connection) to a VPN server 202 provided at a home location 204. The home location 204 and the remote location 208 are often in different geographic locations, sometimes separated by hundreds or even thousands of miles. For example, the home location 204 may be a location within the United States while remote location 208 may correspond to a location such as Saudi Arabia or China or other geographic location having different network controls than those available at the home location 204.

Communication link 214 can be established over a network 206 that may be defined by one or more wired or wireless links communicatively coupled together. One common example of network 206 comprises the Internet, although other exemplary networks 206 may include a dial-in network, a local area network (LAN), wide area network (WAN), public switched telephone network (PSTN), the Internet, intranet or ethernet type networks or others.

Although the application example illustrated in FIG. 2 shows a connection between VPN server and VPN client devices, it should be appreciated that different connection types are also possible. For example, communication links can be established using Point-to-Point VPN (P2P VPN) configurations, allowing users to interconnect and share their network connections directly, mitigating the need for a VPN service. In addition, options may be provided for direct VPN-style tunnels between two points, dynamically located and synchronized centrally, allowing the client to move geographically while maintaining a seamless connection to a remote network.

Although VPN router 210 is connected via cable modem 212 or other customer premises equipment device to an Internet Service Provider 214 at the remote location 208, the communication link 214 tunnels the VPN client to the home location 204 so that it is virtually located there instead of at remote location 208. This arrangement often affords a user the ability to employ network application devices that may otherwise be unavailable due to security controls in place at remote location 208. For example, a first network application device 216 may correspond to a digital media receiver such as an APPLETV or ROKU box or a network-enabled receiver that accesses specific home location applications such as NETFLIX or HULU, each variously enabling a user to access cable television programming or subscription media downloads normally accessible only from home location 204. A second network application device 218 may correspond to a telecommunications device (e.g., VONAGE device or other VOIP device) or a wireless hub for creating a signal access point for a cellular phone or other wireless communications device. This type of arrangement may enable a user to utilize his or her telecommunications handset and/or wireless communications device in remote location 208 when typical network coverage only exists in home location 204.

Figure 3:
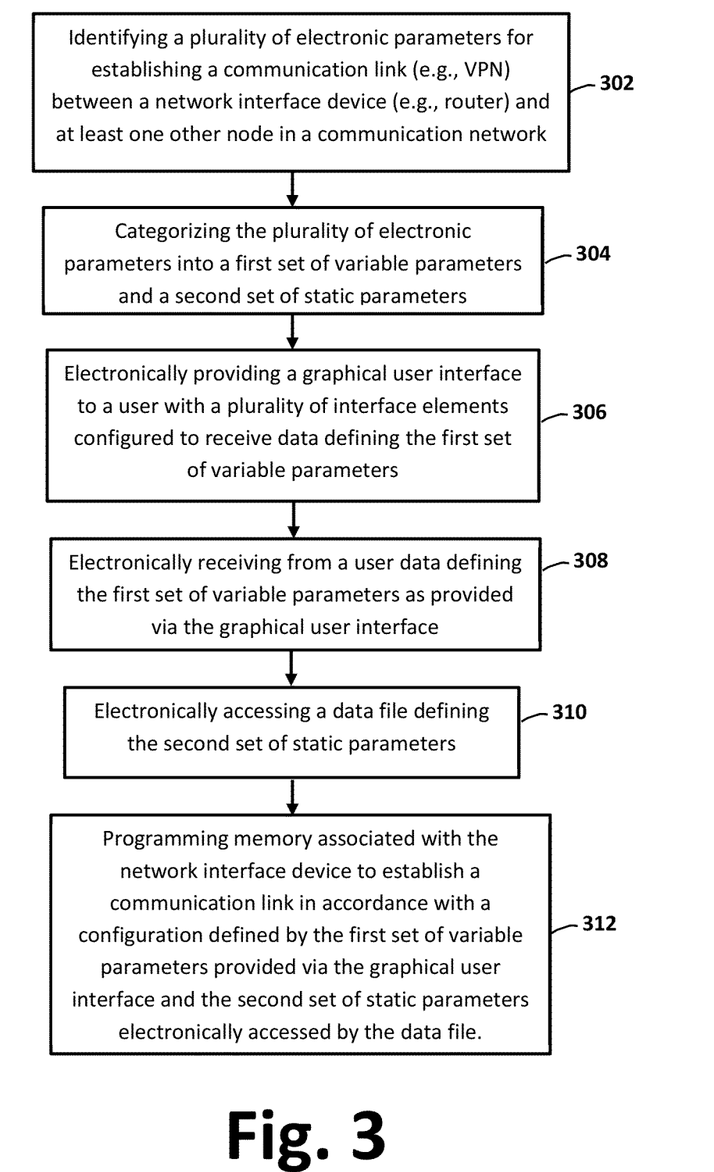
FIG. 3 is a flow chart of exemplary steps in a method of implementing setup configurations for a network interface device.

Referring now to FIG. 3, a flow chart illustrates exemplary steps in a method of implementing setup configurations for a network interface device such as disclosed herein. In a first step 302, a plurality of electronic parameters for establishing a communication link (e.g., a VPN connection) between a network interface device (e.g., a VPN router or client device) and at least one other node in a communication network (e.g., a VPN server or other VPN client) are identified. The electronic parameters needed to establish the communication link are categorized in step 204 into a first set of variable parameters and a second set of static parameters. This categorization may be established by preconfigured definitions or dynamically determined as part of the disclosed application. In step 306, a graphical user interface including a plurality of interface elements is electronically provided to a user in order to receive input defining the first set of variable parameters.

Steps 308 and 310 generally represent the process of gathering the required first set of variable parameters and second set of static parameters needed to effectively setup the communication link between the network interface device and other node(s) in the network. In step 308, user data defining the first set of variable parameters is received via the graphical user interface. The second set of static parameters are not input via the graphical user interface, but instead are obtained by accessing a data file defining such parameters in step 310. The particular data file accessed in step 310 may be selected from a plurality of possible data files based at least in part on the received data defining the first set of variable parameters. For example, if at least one of the variable parameters comprises a network connection type, one data file may be accessed in step 310 for PPTP connection types, while another different data file may be accessed in step 310 for OpenVPN connection types, and yet another data file may be accessed in step 310 for L2TP connection types. A communication link configuration defined by the first set of variable parameters and the second set of static parameters is then programmed in step 312 into memory associated with the network interface device and ultimately executed to establish the communication link.

Figure 4:
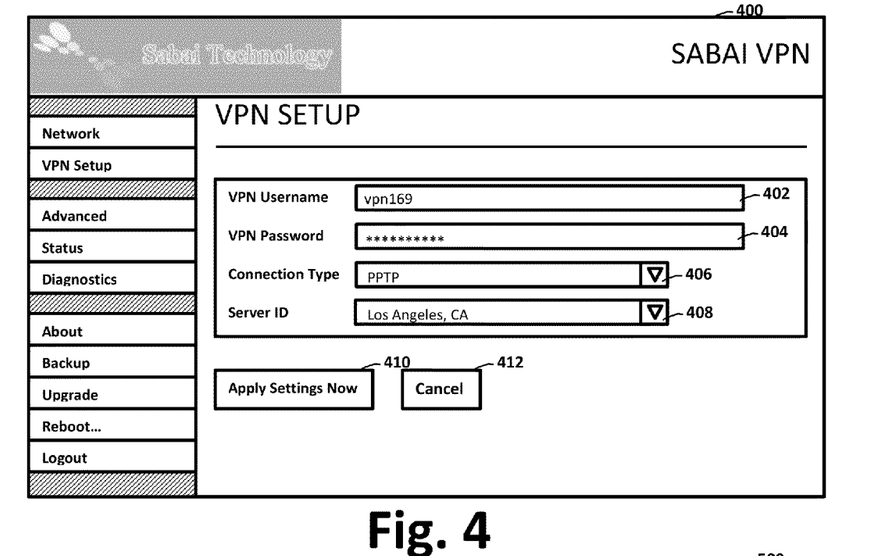
FIG. 4 is a screenshot of a first exemplary graphical user interface in accordance with aspects of the presently disclosed technology.
Figure 5:
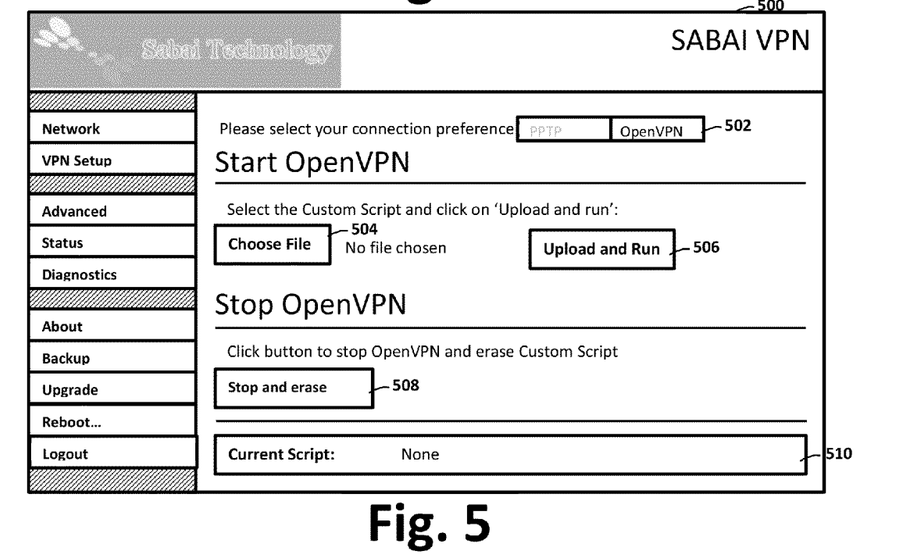
FIG. 5 is a screenshot of a second exemplary graphical user interface in accordance with aspects of the presently disclosed technology.

Referring now to FIGS. 4 and 5, respective screenshots illustrate first and second exemplary GUIs 400, 500 for use in accordance with the disclosed technology. Such GUIs may include both interface elements (e.g., 402-408, respectively, 502 and 504) for gathering the first set of variable parameters from a user as well as additional informative elements for providing such information as descriptive user tools and network connection status indicators. In one example, an interface element (e.g., 406 or 502) is provided for defining a first variable parameter corresponding to a network connection type. In exemplary interface elements 406 and 502, the network connection type may be selectable from a drop-down menu of possible types, including but not limited to PPTP, L2TP and OpenVPN network connection types. In another example, an interface element (e.g., 408) is provided for defining a node identifier for the at least one other node in the communications network to which a given network interface device ultimately desires connection. The node identifier may comprise one or more of a node ID (e.g., an IP address or representative node name), a geographic location for the node, or other suitable identifier such as may be preferred by a VPN service. Additional interface elements (e.g., 402 and 404) may be provided for defining a user identifier (e.g., VPN user name or IP address) and a user password or other security code. Still further GUI embodiments may provide interface elements for defining additional security keys, routing settings, tunnel up/down commands and other VPN related settings.

Referring still to FIGS. 4 and 5, it should be appreciated that the specific layout of each GUI 400, 500 as well as the specific implementations of the various interface elements can vary significantly according to client or server preferences. In the example of GUI 400, interface elements 402 and 404 for receiving username and password data are provided in the form or text entry elements, whereas interface elements 406 and 408 for defining the network connection type and server identifier are provided in the form of drop-down selection menus. Still further, interface elements 410 and 412 are provided as selectable buttons. For example, selectable button 410 triggers the execution of instructions to apply the settings defined in interface elements 402-408, while selectable button 412 triggers the execution of instructions to cancel the pending settings for the network interface device.

In the example of GUI 500, interface element 502 for selecting the network connection type is provided in the form of a selectable button, while interface element 504 is provided as a file selection element for defining a file pointer for a data file. The data file identified using interface element 504 ultimately includes all data identified by the second set of static parameters as well as any additional parameters other than the file pointer in the first set of variable parameters. When interface element 506 is selected by a user, the data file identified by the file pointer selected via element 504 and further identified using information element 510 is programmed into memory associated with the network interface device and ultimately executed by the device processor. Selectable interface element 508 stops execution of the data file and erases it from the associated memory.

Still further features may be available as part of the GUIs 400, 500 or other modules of the present application. For example, some embodiments of the disclosed technology may implement VPN service specific web integration that will allow the user to select connections from their VPN service's web site from within a router's interface. Hardware-level encryption acceleration features may also be provided, possibly also making use of stream processors and GPGPUs. Integrated, automated diagnostics that reduce the time required to provide technical support and allow the user to fix issues with a button click may also be provided.

The above-described features and steps provide a plurality of advantages. In particular, the custom setup process for a network interface device such as a router is significantly simplified by streamlining the device setup procedure and automating the major tasks required to implement device setup. In contrast to known conventional solutions that require significant technical knowledge and time invested, the disclosed features and steps provide an application by which normally complex commands and settings are input using a simplified interface. These features provide the benefit of reducing potential errors (e.g., scripting issues with browser compatibility, slow computers, unforeseen returns, etc.) in the client setup process for home and/or business networks. In addition, these features provide beneficial simplification of VPN installation of complex commands and security components necessary for the successful establishment of a VPN connection.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of implementing setup configurations for a network interface device, comprising:

identifying a plurality of electronic parameters that need to be programmed into memory associated with a network interface device to properly establish a communication link with at least one other node in a communication network;

electronically providing a graphical user interface to a user, said graphical user interface comprising a plurality of interface elements configured to receive data defining a first set of variable parameters, wherein said first set of variable parameters corresponds to variable parameters which change based on at least one of user selection and customization, at least one of said user selection and customization being based upon specific options available to a client of said network interface device;

analyzing and mapping the first set of variable parameters to a set of static parameters electronically via an application layer module, wherein said set of static parameters corresponds to static parameters required to program said network interface device, said static parameters being defined at least in part by direct dependencies with data which defines the first set of variable parameters;

electronically receiving from a user data defining the first set of variable parameters as provided via the graphical user interface;

electronically accessing a data file defining the set of static parameters;

automatically programming the memory associated with the network interface device to establish a communication link in accordance with a configuration defined by the first set of variable parameters provided via the graphical user interface and the set of static parameters electronically accessed by the data file.

2. The method of claim 1, wherein said network interface device is a router.

3. The method of claim 1, wherein said network interface device is a virtual private network (VPN) router and wherein the at least one other node in a communication network comprises a VPN server provided in a different geographic location than the VPN router.

4. The method of claim 1, wherein said first set of variable parameters comprises a first variable parameter corresponding to a network connection type and a second variable parameter corresponding to an identifier for the at least one other node in a communication network.

5. The method of claim 4, wherein said network interface device comprises a virtual private network (VPN) router, wherein said at least one other node in a communication network comprises a virtual private network (VPN) server, and wherein said second variable parameter corresponding to an identifier for the at least one other node in a communication network defines a server location.

6. The method of claim 4, wherein said first set of variable parameters further comprises a third variable parameter corresponding to a user identifier and a fourth variable parameter corresponding to a user password.

7. The method of claim 4, wherein said first variable parameter corresponding to a network connection type is selectable as one of a PPTP connection type, an OpenVPN connection type, or a L2TP connection type.

8. The method of claim 1, wherein said first set of variable parameters comprises a file pointer for a data file defining all data identified by the second set of static parameters as well as any additional parameters other than the file pointer in the first set of variable parameters, and wherein said method further comprises a step of programming the memory associated with the network interface device with the data file.

9. A network interface device, comprising:
at least one memory device configured for storing computer readable instructions defining an operating system and associated application for implementing a virtual private network (VPN) on the network interface device;
wherein said computer readable instructions comprise a plurality of executable modules, said modules comprising a graphical user interface module, an automation layer module and a firmware module;
wherein said graphical user interface module comprises instructions for electronically providing a graphical user interface to a user, said graphical user interface providing interface elements by which a user may provide customizable input for a plurality of interface elements, each one of the plurality of interface elements corresponding to one of a first set of variable parameters, wherein said first set of variable parameters corresponds to variable parameters which change based on at least one of user selection and customization, at least one of said user selection and customization being based upon specific options available to a client of said network interface device;

wherein said automation layer module comprises instructions defining the type of graphical user interface to display to a user and instructions for electronically accessing a particular data file defining a set of static parameters, wherein said set of static parameters corresponds to static parameters required to program said network interface device, said static parameters being defined at least in part by direct dependencies with data which defines the variable parameters, said automation layer module further comprising instructions for analyzing and mapping the first set of variable parameters to an additional set of static parameters;

wherein said firmware module comprises instructions for programming the network interface device to establish a VPN connection in accordance with a configuration defined by the first set of variable parameters provided via the graphical user interface and the additional set of static parameters electronically accessed by the automation layer module; and a processor configured to execute the computer readable instructions stored in said firmware module and to establish a VPN connection with at least one other VPN node provided in a different geographic location than the network interface device.

10. The network interface device of claim 9, wherein said network interface device comprises a virtual private network (VPN) router and wherein the at least one other VPN node comprises a different VPN router or a VPN server.

11. The network interface device of claim 9, wherein said first set of variable parameters comprises a first variable parameter corresponding to network connection type and a second variable parameter corresponding to an identifier for the at least one other VPN node.

12. The network interface device of claim 11, wherein said first set of variable parameters further comprises a third variable parameter corresponding to a user identifier and a fourth variable parameter corresponding to a user password.

13. The network interface device of claim 11, wherein said first variable parameter corresponding to a network connection type is selectable as one of a PPTP connection type, an OpenVPN connection type, or an L2TP connection type.

14. The network interface device of claim 9, wherein said first set of variable parameters comprises a file pointer for a data file defining all data identified by the second set of static parameters as well as any additional parameters other than the file pointer in the first set of variable parameters, and wherein said processor is further configured to program the memory associated with the network interface device with the data file.

15. One or more non-transitory computer-readable media storing computer-executable instructions that, when executed by one or more processors, cause the one or more processors to perform the following actions:
identify a plurality of electronic parameters that need to be programmed into memory associated with a router to properly establish a communication link with at least one other node in a communication network;
electronically provide a graphical user interface to a user, said graphical user interface comprising a plurality of interface elements configured to receive data defining the first set of variable parameters, wherein said first set of variable parameters corresponds to variable parameters which change based on at least one of user selection and customization, at least one of said user selection and customization being based upon specific options available to a client of said network interface device;

electronically analyze and map the first set of variable parameters to a set of static parameters via an application layer module, wherein said set of static parameters corresponds to static parameters required to program said network interface device, said static parameters being defined at least in part by direct dependencies with data which defines said first set of variable parameters;

electronically receive from said graphical user interface user data defining the first set of variable parameters as provided via the graphical user interface;

electronically access a data file defining the set of static parameters;

program the memory associated with the router to establish a communication link in accordance with a configuration defined by the first set of variable parameters provided via the graphical user interface and the set of static parameters electronically accessed by the data file.

16. The non-transitory computer-readable media of claim 15, wherein said router is a virtual private network (VPN) router and wherein the at least one other node in a communication network comprises a different VPN router or a VPN server provided in a different geographic location than the VPN router.

17. The non-transitory media of claim 15, wherein said first set of variable parameters comprises a first variable parameter corresponding to network connection type and a second variable parameter corresponding to an identifier for the at least one other node in a communication network.

18. The non-transitory media of claim 17, wherein said first set of variable parameters further comprises a third variable parameter corresponding to a user identifier and a fourth variable parameter corresponding to a user password.

19. The non-transitory media of claim 17, wherein said first variable parameter corresponding to a network connection type is selectable as one of a PPTP connection type, an OpenVPN connection type, or an L2TP connection type.

20. The non-transitory media of claim 15, wherein said first set of variable parameters comprises a file pointer for a data file defining all data identified by the second set of static parameters as well as any additional parameters other than the file pointer in the first set of variable parameters, and wherein said method further comprises a step of programming the memory associated with the network interface device with the data file.

* * * * *